United States Patent [19]

Forrest et al.

[11] Patent Number: 5,655,041

[45] Date of Patent: Aug. 5, 1997

[54] METHOD AND APPARATUS FOR ACTIVE ALIGNMENT OF SEMICONDUCTOR OPTICAL WAVEGUIDES

[75] Inventors: Stephen R. Forrest; Chih-Ping Chao, both of Princeton, N.J.

[73] Assignee: The Trustees of Princeton University, Princeton, N.J.

[21] Appl. No.: 549,434

[22] Filed: Oct. 27, 1995

[51] Int. Cl.⁶ .................................................. G02B 6/30
[52] U.S. Cl. .............................. 385/49; 385/31; 385/21; 385/45; 372/50; 438/7; 438/27
[58] Field of Search .................. 385/49, 50, 43–45, 385/2, 3, 14, 31; 437/23; 372/50

[56] References Cited

U.S. PATENT DOCUMENTS 5,524,076   6/1996   Rolland et al. ..................... 385/45 X

OTHER PUBLICATIONS

Jeffrey S. Cites and Paul R. Ashley, "High–Performance Mach–Zehnder Modulators in Multiple Quantum Well GaAs/AlGaAs," *Journal of Lightwave Technology*, vol. 12, No. 7, Jul. 1992.

N. Agrawal, C.M. Weinert, H.–J. Ehrke, G.G. Mekonnen, D. Franke, C. Bornholdt, and R. Langenhorst, "Fast 2 × 2 Mach–Zehnder Optical Space Switches Using InGaAsP–InP Multiquantum–Well Structures," *IEEE Photonics Technology Letters*, vol. 7, No. 6, Jun. 1995.

Primary Examiner—Phan T. H. Palmer
Attorney, Agent, or Firm—Watov & Kipnes, P.C.

[57] ABSTRACT

A method and apparatus for aligning optical fibers to light input and output ports or ends of a semiconductor waveguide device includes forming an LED diode in the associated substrate proximate each associated port. Each LED is positioned emitting light from the primary output mode position of its associated port. During alignment of an optical fiber to a given port, one end of the fiber is adjustably positioned adjacent the light output/input area at the given port in close contact thereto, and the other end of the optical fiber is connected to an input of an optical power meter the associated LED is energized, and the one end of the optical fiber is adjusted in position to maximize the light output intensity or power detected by the meter.

30 Claims, 5 Drawing Sheets

METHOD AND APPARATUS FOR ACTIVE ALIGNMENT OF SEMICONDUCTOR OPTICAL WAVEGUIDES

GOVERNMENT RIGHTS

This invention was made with Government support under grants from ARO No. 341-6017 (Princeton University), ARPA No. F 19628-94-C-0045 P00001 and the U.S. Army Cecom No. DAAB07-92-C-1. The government has certain rights in the subject invention.

FIELD OF THE INVENTION

The field of the present invention relates generally to optical semiconductor waveguide devices, and more particularly to methods and apparatus for aligning the ends of optical fibers to input and output ports or ends of the waveguide device for maximizing the optical power or light intensity of the lightwave transferred between the optical fibers and the input/output ports of the waveguide device.

BACKGROUND OF THE INVENTION

In attaching optical fibers and/or fiber optic cables to the input and output ends or ports of an optical semiconductor waveguide device it is critical to maximize the light coupling there between. In the prior art different methods and apparatus have been devised for attempting to maximize the coupling of optical fibers to semiconductor waveguide devices for maximizing the optical power transferred there between. Ideally, insertion losses, coupling mode mismatches, Fresnel reflections, and radiative losses must be minimized, while output coupler collection efficiencies must be maximized. One way toward accomplishing this task is to insure that the end of the optical fiber coupled to an input or output port or end of a semiconductor waveguide is positioned for the maximum transfer of light energy there between. One method for accomplishing this is to adjustably connect an individual end of each one of two optical fibers to an input port or output port of an optical semiconductor waveguide. A light source is connected to the other end of the input optical fiber, and an optical power meter may be connected to the other end of the output optical fiber. The coupling ends of the input and output optical fibers are then repositioned in a trial and error manner for maximizing the power output read on the optical power meter. The coupling ends of the input and output optical fibers are then fixed or secured in place at their associated input and output ends of the optical waveguide. This technique is extremely time consuming and costly, particularly in view of semiconductor waveguides having primary mode optical paths and secondary mode optical paths, making it difficult to insure that the optical input beams are initially coupled to a primary mode position at the corresponding end of the waveguide. The present inventors recognized that the time and cost for aligning the ends of optical fibers to input and output ports of optical semiconductor waveguide devices could be minimized if some method or apparatus is devised for permitting the optical fibers to be initially positioned at a primary mode position at the input or output end of the waveguide device in a relatively rapid manner, where after traditional alignment methods can be employed for making the fine adjustments in position for maximizing the coupling efficiency.

SUMMARY OF THE INVENTION

One object of the present invention is to provide improved methods and apparatus for aligning optical fibers to an optical semiconductor waveguide device for maximizing the efficiency of coupling there between.

Another object of the invention is to provide a method and apparatus for optically aligning optical fibers to the input and output ends or ports of an optical semiconductor waveguide device through use of integrated waveguide light emitting diodes formed in the waveguide.

With these and other objects in mind, one embodiment of the present invention provides for forming integrated waveguide light emitting diodes at the input and output ports or ends of the light paths of a semiconductor waveguide device, and positioning the diodes for emitting light from the primary mode positions of the associated input/output port or end of the semiconductor waveguide device. Coarse alignment of an end of an optical fiber to an input/output port of the semiconductor waveguide device is made by energizing the associated light emitting diode, and holding the one end or coupling end of the optical fiber or fiber optic cable via three axis adjustable means in close proximity to the associated light port of the waveguide device. The other end of the optical fiber or fiber optic cable is connected to an optical power meter, and the coupling end is adjusted for obtaining the maximum optical power output reading on the meter. The ends of optical fibers or fiber optic cables are so positioned at two input/output ports between which the associated waveguide is to pass a lightwave. After the coarse alignment is made, final or fine alignment is provided by connecting a desired lightwave or beam of light to the free end of the optical fiber or fiber optic cable associated with the input port or end of the associated semiconductor waveguide device, and an optical power meter to the free end of the output optical fiber or fiber optic cable connected to the associated output port or end of the semiconductor waveguide. The fine adjustment is made by then repositioning the coupling ends of the input and output optical fibers or fiber optic cables for maximizing the optical power read on the associated optical power meter. After the fine alignment is made, the coupling ends of the input and output optical fibers or fiber optic cables are fixed in place to the associated ports, respectively, of the optical waveguide.

BRIEF DESCRIPTION OF THE DRAWINGS

Various embodiments of the present invention are described and illustrated with reference to the drawings, in which like items are identified by the same reference designation, wherein.

DETAILED DESCRIPTION OF THE INVENTION

There are many different optical waveguide configurations known in the prior art. With reference to FIGS. 1 through 4, four such known configurations are shown. More specifically, in FIG. 1 a straight optical waveguide is shown. Typically, such a device is asymmetrical, and the two ends serve as either an input or an output end, for coupling to an end of a fiber optic cable or optical fiber, or to a light detecting diode, for example.

Figure 1:
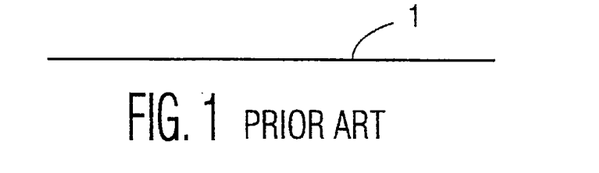
FIG. 1 is a simplified diagram of a prior straight optical waveguide.
Figure 2:
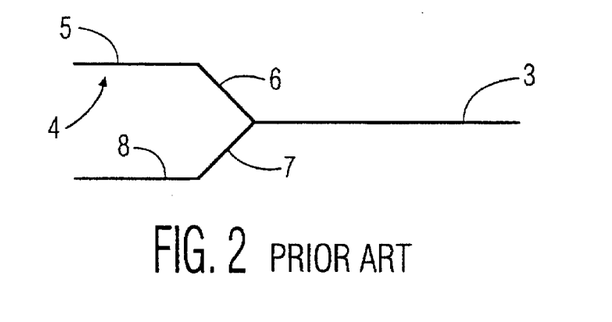
FIG. 2 is a simplified pictorial of a prior straight optical waveguide terminated in a Y-junction.

In FIG. 2 a waveguide known as a Y-junction is shown to include a straight waveguide portion 3 terminating at one end to a Y-junction 4. As shown, the Y-junction 4 includes two arms 6 and 8 at an angle to the straight section 3, with ends of each of the arms 6 and 8 having a common connection to one end of the straight section 3. The other end of arm 6 is connected to one end of a straight arm portion 5 that is typically oriented to be parallel to the horizontal plane of the straight section 3. The other end of the arm 8 is connected to one end of another straight arm section 7, the latter typically being oriented and parallel with the horizontal plane of the straight waveguide section 3.

Two examples of use of the waveguide configuration of FIG. 2 are as a light beam mixer, or light beam splitter. When used as a light beam splitter, the free end of straight section 3 serves as an input end for receiving a beam of light, and the other ends of arms 5 and 7 respectively serve as first and second output ends, for outputting split off portions of the light beam received by the input end. When serving as a mixer, the waveguide configuration of FIG. 2 is coupled to first and second light beams via the free ends of arms 5 and 7, respectively, serving as first and second input ports or ends, and the free end of straight section 3 serves as an output port for outputting a mixed light beam of the light beams coupled to the first and second inputs.

Figure 3:
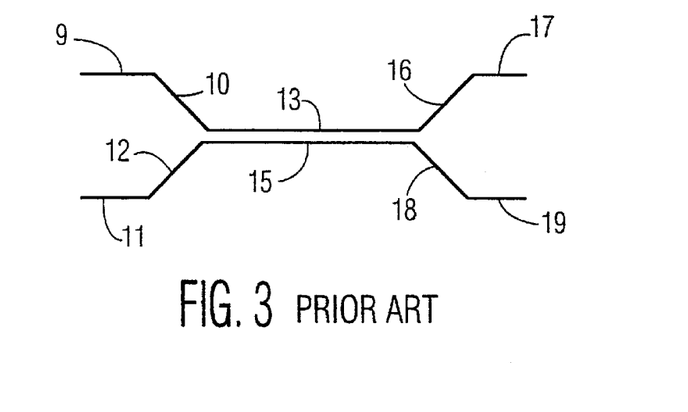
FIG. 3 is a simplified pictorial of a prior 3 dB optical coupler/switch.

In FIG. 3, a 3 dB coupler switch configuration is shown. This configuration includes two central straight waveguide portions 13 and 15 that are parallel and spaced apart. One end of waveguide or lightpath section 13 is connected to one end of a sloping arm 10, and the other end of waveguide section 13 is connected to one end of a sloping arm or waveguide section 16. The other end of arm 10 is connected to one end of a straight waveguide section 9 that is typically parallel to the horizontal plane of straight sections 13 and 15. The other end of arm 16 is connected to one end of a straight arm section 17 that is typically parallel to the horizontal plane of the central straight waveguide sections 13 and 15. Similarly, one end of the straight section 15 is connected to one end of a downwardly sloping section 12, with the other end of the latter being connected to one end of a straight section 11, the latter being parallel to the horizontal plane of straight section 15. The other end of the straight waveguide section 15 is connected to one end of a downwardly sloping arm 18, the other end of which is connected to one end of a straight arm waveguide section 19, the latter being parallel to the horizontal plane of the central straight waveguide section 15. The ends of arms 9, 11, 17, and 19, serve as input/output terminations or ports for connection to one end of individual optical fibers or fiber optic cables (not shown) for coupling light beams into and out of the waveguide device.

Figure 4:
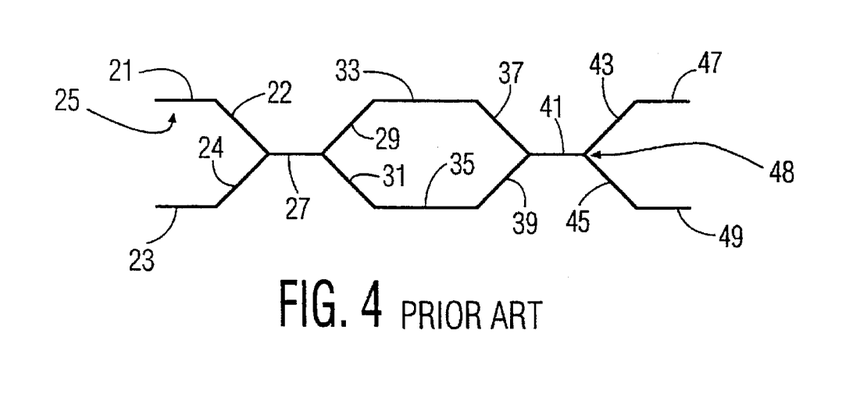
FIG. 4 is a simplified pictorial of a prior Mach-Zehnder interferometer or modulator terminating to Y-junctions at each end.

FIG. 4 shows a Mach-Zehnder interferometer plus a Y-junction configuration. As shown, the configuration includes two spaced apart and parallel waveguide sections or arms 33 and 35. One end of arm 33 is connected to one end of a downwardly sloping arm 29, and one end of arm 35 is connected to one end of an upwardly sloping arm 31. The other ends of arms 29 and 31, respectively, are joined together with one end of a straight arm section 27 that is parallel to the horizontal planes of parallel arms 33 and 35, and also represents the trunk of a Y-junction 25. The latter also includes upwardly sloping arm 22 and downwardly sloping arm 24 each having an end joined in common to the other end of the trunk arm 27. The other ends of arms 22 and 24 are connected to one end of a straight arm 21 and one end of a straight arm 23, respectively. The straight arms 21 and 23 are parallel to one another and to the parallel plane of straight arm sections 33 and 35. The other ends of the straight arm sections 21 and 23 provide input/output ports or ends for the configuration. The other end of arm 33 is connected to one end of a downwardly sloping arm 37, and the other end of arm 35 is connected to one end of an upwardly sloping arm 39, whereby the other ends of arms 37 and 39 are joined in common to one end of a trunk section 41 of another Y-junction 48. Arm 41 is substantially in the same plane as arm 27, and arm 41 is also parallel to the horizontal plane of arms 33 and 35. The other end of trunk arm 41 is connected in common to one end of upwardly sloping arm 43, and one end of downwardly sloping arm 45 forming branches of the associated Y-junction 48. The other ends of arms 43 and 45 are connected to one end of straight arm sections 47 and 49, respectively. The other ends of straight arm sections 47 and 49 provide input/output ports or ends for the waveguide configuration. Also, arms 47 and 49 are typically parallel to one another and to the horizontal planes of arms 33 and 35.

Figures 5, 6, 7:
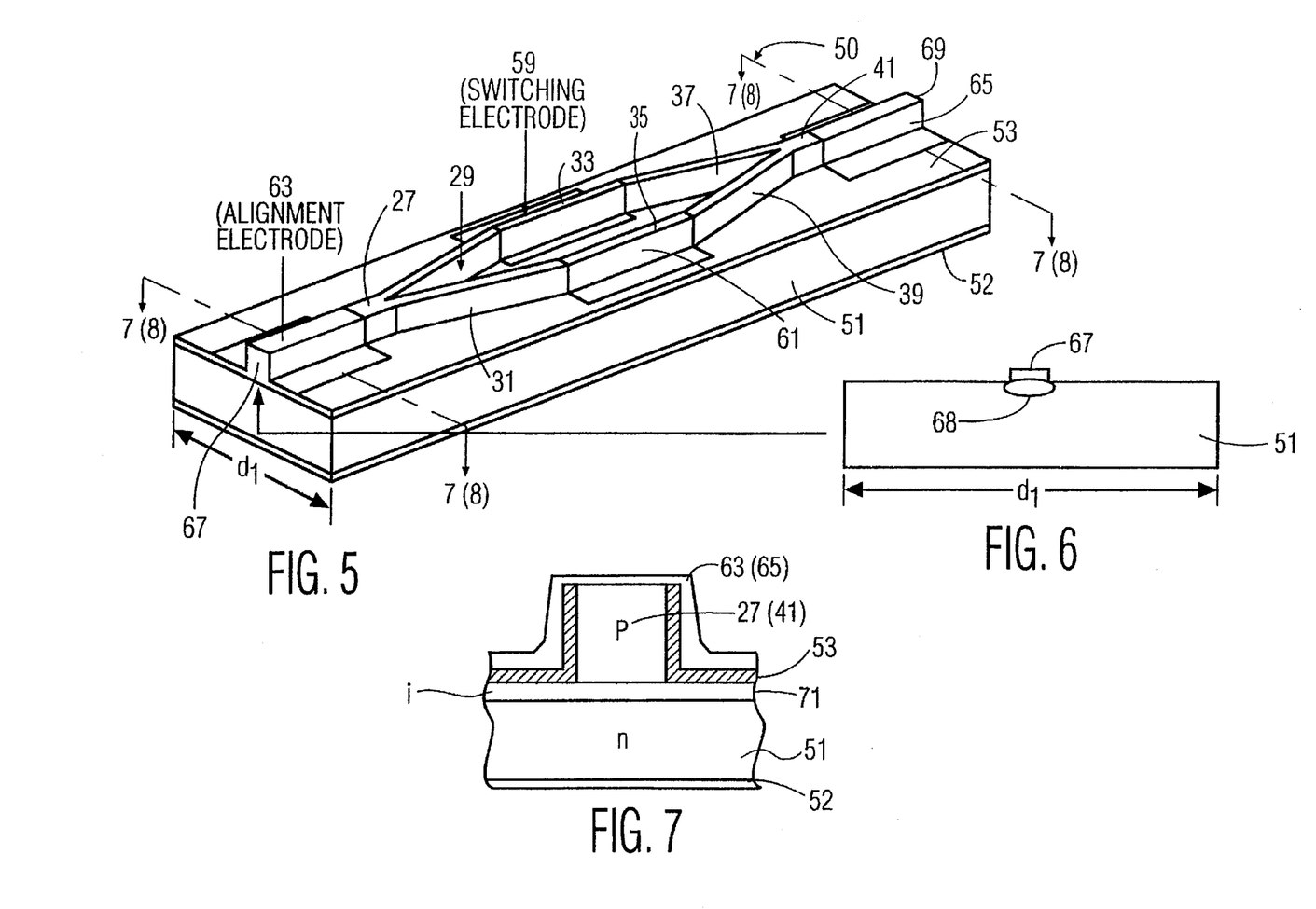
FIG. 5 is a simplified pictorial illustration of a Mach-Zehnder modulator incorporating one embodiment of the present invention.
FIG. 6 is a pictorial illustration of the alignment light emitted from the end of a waveguide incorporating an alignment LED of one embodiment of the present invention.
FIG. 7 shows a cross-sectional view taken along 7—7 of FIG. 5 of an alignment LED structure of one embodiment of the present invention.
Figure 8:
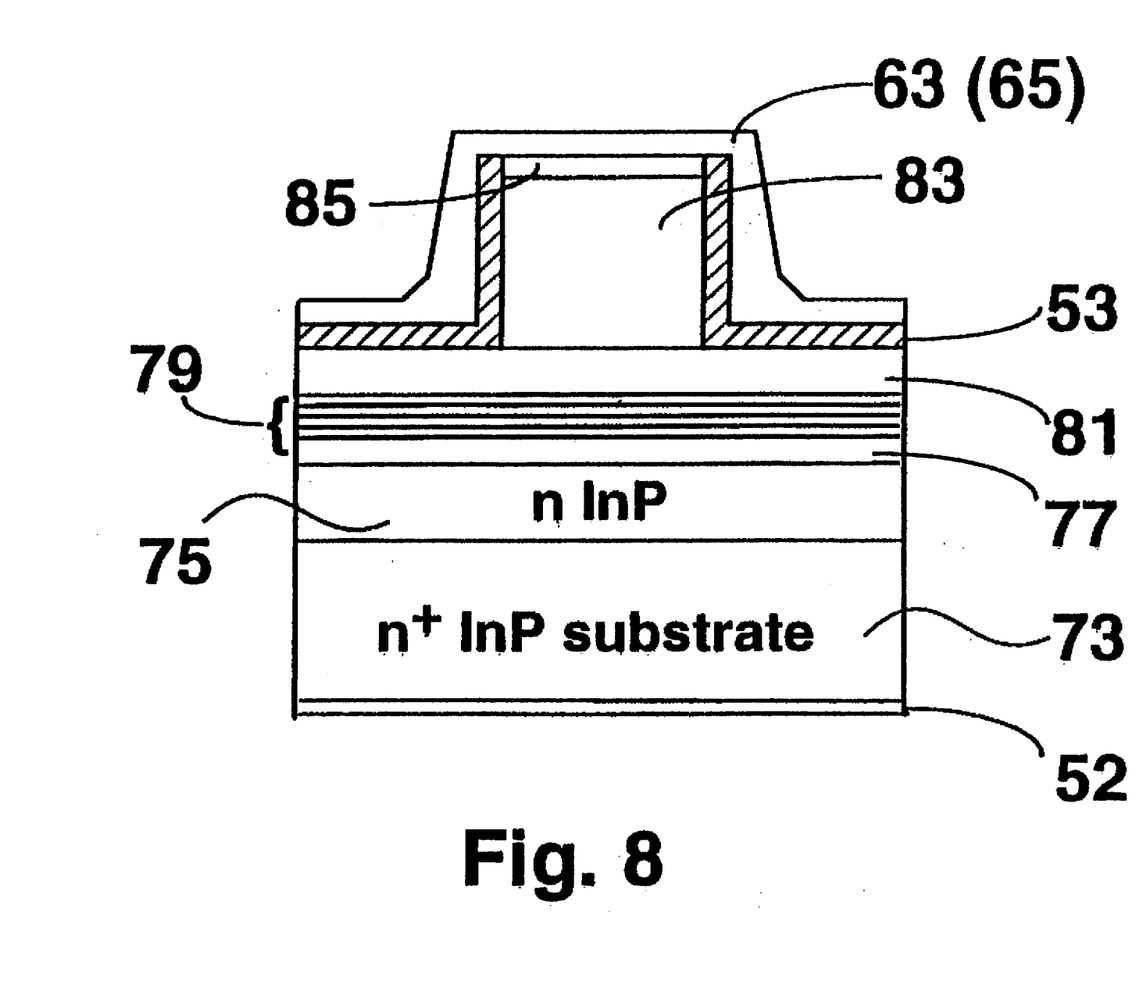
FIG. 8 shows the cross-section taken along 8—8 of FIG. 5 of an alignment LED of another embodiment of the invention.

One embodiment of the invention is shown in FIG. 5 in use in a Mach-Zehnder modulator 50. In general terms, the modulator 50 includes a substrate 51 having formed thereon an insulating layer 53. Waveguide arms 27, 29, 31, 33, 35, 37, 39, and 41 are formed on top of the substrate in the same configuration as in FIG. 4, except that the Y-junctions 25 and 48 of FIG. 4 are not used in the configuration of FIG. 5. Switching electrodes 59 and 61 are formed over the waveguide sections or arms 33 and 35, respectively. As is known in the art, the switching electrodes 59 and 61 are used for modulating the light waves passing through arms 33 and 35, respectively. A common electrode or reference electrode 52 is formed on the bottom of the substrate 51, as shown. Alignment electrodes 63 and 65 are formed over end portions of arms 27 and 41, respectively. In this illustrated embodiment of the invention, a first light-emitting diode is formed between electrodes 63 and 52 near the free end or input/output end of 67 of arm 27, and a second light-emitting diode is formed between electrodes 65 and 52 proximate the output/input end 69 of arm 41. The first and second light emitting diodes can generally be formed for use as will be described for any semiconductor optical waveguide as shown in FIG. 7, to be described in detail below. Also, for a Mach-Zehnder modulator configuration such as in FIG. 5, the first light emitting diode (LED) and second LED can be formed as shown in FIG. 8, to be described in detail below. For purposes of this general discussion, assume that the first and second LED's are positioned to emit light when forward biased via a forward biased voltage being applied across electrodes 63 and 52, and 65 and 52, respectively, for emitting light out of the primary mode area at the waveguide ends 67 and 69, respectively.

Note that typically the dimensions of the Mach-Zehnder modulator 50 illustrated are very small, and the distance between arms 33 and 35 is about 20 microns. Also, with reference to FIG. 6, the width $d_1$ at the ends 67 and 69 of waveguide arm 27 and 41, respectively, is typically <5 microns. If the associated LED devices are forward biased by applying a voltage across alignment electrode 63 and electrode 52, the associated first LED will emit light as a spot, typically oval or elliptical, approximately equal to the width of the waveguide and having diameters of about (3–10×1–2) microns from the primary mode portion of the light path at port 67. Likewise, when the second LED is forward biased by applying an appropriate voltage across electrodes 65 and 52, a similar spot of light will be emitted from the primary mode of the area of the end or face 69 of waveguide arm 41, for example. Note that the size of the light spot emitted depends upon the configuration of the associated LED, and the materials used. As will be described in greater detail below, the first and second LED's provide for active alignment of the ends of optical fibers or fiber optic cables to the input/output port or ends of arms 27 and 41 of the illustrated optical modulator 50, by adjusting the positioning of the end of an optical fiber or a fiber optic cable to the associated end 67 or 69, for maximizing the power or light intensity detected on a optical power meter connected to the other end of the fiber optic cable, as will be described in greater detail below.

In FIG. 7, each of the first and second LED's can be provided as shown. More specifically, the common or reference electrode 52 is formed on the bottom of substrate 51, as previously illustrated, and the substrate 51 is doped to have an n-type conductivity, in this example. An intrinsic layer 71 is formed over the substrate 51. A narrowed region or waveguide arm portion 27 (41) is formed over the intrinsic layer 71 and doped to have a p-type conductivity, in this example. The sides of the waveguide or light path portion 27 (41) have an overlying insulative layer 53 formed thereon, and on the top of the intrinsic layer 71. An alignment electrode 63 (65) is formed over the insulative layer 53 and the top of the narrowed waveguide section 27 (41), as shown. Note that similar alignment LED's, for other embodiments of the invention, can be formed at the ends of the various waveguide configurations shown in FIGS. 1 through 4, for permitting the ends of optical fibers or fiber optic cables to be aligned or optimally coupled to the ends of these waveguides, in the manner illustrated and described herein. However, it should also be noted that the method and apparatus of the various embodiments of this invention are not meant to be limited to the waveguide configurations shown and illustrated herein, but are meant to be applicable for any semiconductor optical waveguide to which an end of an optical fiber or cable is to be aligned and connected.

In another embodiment of the invention, the material for the alignment LED's of FIG. 7 will now be described, but are not meant to be limiting, and are illustrated for purposes of example only. Electrode 52 can be provided by GeAuNiAu material; substrate 51 by InP material; intrinsic layer 71 by InGaAsP material; and layer 27 (41) by InP material. The electrical contact 63 (65) can consist of TiPtAu material. Alternatively, the substrate 51 can be provided by GaAs material, the intrinsic layer 71 by InGaAs material, and the layer 27 (41) by GaAs material.

In FIG. 8, the first and second light emitting diodes for the Mach-Zehnder modulator structure shown in FIG. 5 are preferred to have the more complicated structure shown. More specifically, with reference to FIG. 8, each of the first and second diodes are in one embodiment provided by the electrode 52 formed over the bottom of substrate 73 doped to have an $n^+$ conductivity, with a layer 75 overlying the top of substrate 73. Layer 75 is doped to have an n conductivity, and can be a doped region of a substrate in common with substrate 73. An intrinsic layer 77 is formed over layer 75. Multiple quantum wells (MQW) in a layer 79 are formed over layer 77, and an intrinsic layer 81 is formed over the MQW layers 79. A relatively narrow layer 83 is formed over layer 81, with the former having a p conductivity.

In one example, the materials for the layers can consist of In for the substrate 73 and layer 75. Layers 77 and 81 can consist of InGaAsP material, and layer 83 can consist of InP material. The insulator layer 53 can be formed from SiNx or $SiO_x$ material, and a relatively narrow capping layer 85 overlying layer 83 can consist of InGaAs material. Also, in one engineering prototype of the Mach-Zehnder modulator 50 of FIG. 5 including the first and second light emitting diodes between each of alignment electrodes 63 and 65, and the common or cathode electrode 52, respectively, as previously described, the thicknesses used for each layer will now be given for purposes of illustration. Electrode 63 (65) consists of a 200 Å thick Ti, the Pt being 500 Å, and the Au portion being 3,000 Å. Layer 85 is 2,000 Å, layer 83 is one micron, layer 81 is 1,000 Å, layers 79 are 750 Å, layer 77 is 1,000 Å, layer 75 is one micron, and layer 73 is 100 microns. Contact 52 is formed from 270 Å/450 Å/215 Å/1,200 Å thick layers of GeAuNiAu, respectively. Also, the first and second light emitting diodes so formed in this example were about 120 microns long. None of the thicknesses or other dimensions given are meant to be limiting, and are provided for purposes of illustration only. Also, the diodes shown in FIGS. 7 and 8 each have a P-I-N structure.

Figure 9:
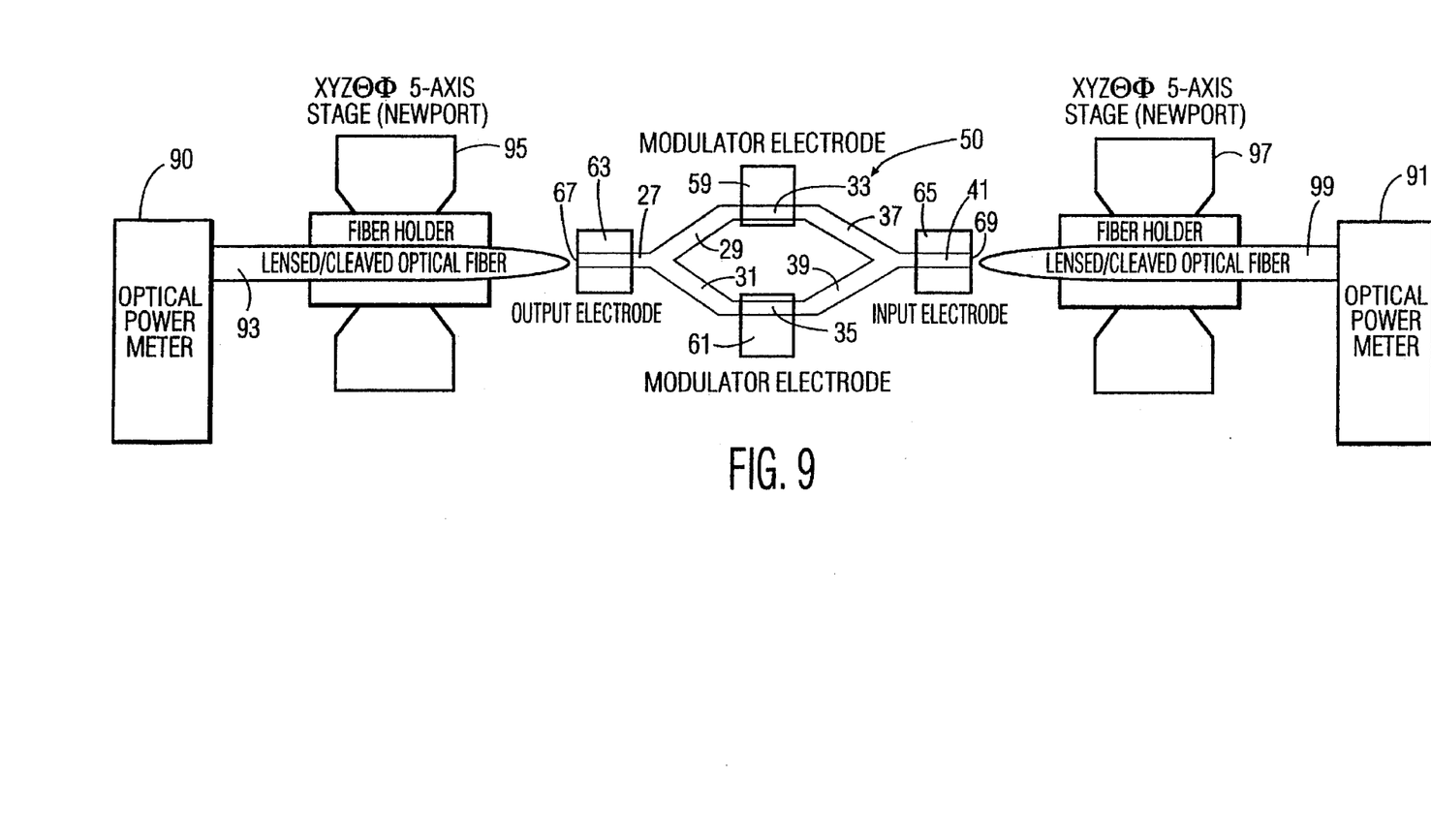
FIG. 9 is a simplified pictorial diagram showing the apparatus alignment setup for aligning ends of optical fibers or fiber optic cables to input/output ports of a Mach-Zehnder modulator for one embodiment of the invention.

In FIG. 9, the apparatus employed for one embodiment of the method and apparatus of the present invention is shown in a simplified pictorial diagram. The steps for a method of alignment using the apparatus will now be described.

As shown in FIG. 9, the alignment configuration includes optical power meters 90 and 91. One end of an output optical fiber or cable 93 is connected to an input of optical power meter 90, and the other end of the optical fiber 93 is closely coupled to the output end 67 of modulator 50. Optical fiber 93 is held adjustably in place through use of a XYZθφ 5-axis stage fiber holder 95. Such stages as 95 can be obtained from Newport Inc., of California, or Thor Lab, of N.J., for example. Another XYZθφ 5-axis stage fiber holder 97 is used for retaining and positioning one end of an optical fiber 99 for coupling to the input port or end 69 of modulator 50. The other end of optical fiber 99 is connected to an input of an optical power meter 91.

Once the alignment apparatus is set up as shown in FIG. 9, ends of an output optical fiber 93 and input optical fiber 99 can then be aligned with and affixed to output and input ports of a waveguide device, such as ports 67 and 69, respectively, of the illustrative optical modulator 50. Next, using a microscope (not shown), the end of the input optical fiber 99 is moved as close as possible to the input port 69. With the other end of the input fiber 99 connected to the optical power meter 91. A forward bias voltage is then applied across the input alignment electrode 65 and the common electrode 52 (see FIG. 5). It should be noted that a forward bias voltage of from 2 to 3 volts DC is usually sufficient for energizing the associated LED for an InP or GaAs based passive waveguide device. The light emitted from the input port 69 is passed through the optical fiber 99 to the optical power meter 91. The next step is to maximize the detected optical power by adjusting the XYZθφ 5-axis stage 97 to properly position the end of the optical fiber to the input port 69. The time for accomplishing this alignment step can be minimized by using a computer controlled stage 97.

To align the end of the output optical fiber 93 to the output port 67 of modulator 50, in this example, the optical power meter 90 and XYZθφ 5-axis stage 95 are used in the same manner for aligning the optical fiber 93 as was used with the stage 97 and optical power meter 91 for aligning the input optical fiber 99. The alignment method or process is initiated by applying a forward bias voltage across output alignment electrode 63 and the common electrode 52 for energizing the associated output LED to emit light out of the output port 67. Steps as previously described for the LED at the input port 69 are then pursued.

The alignment procedure just described for the output optical fiber 93 and input optical fiber 99 couplings to the output port 67 and input port 69, respectively, can be considered a coarse alignment. The final or fine alignment adjustment is made by removing the end of optical fiber 99 from the optical power meter 91, and connecting a desired input signal, such as a laser light (not shown), to this end of the input optical fiber 99, after first removing the bias voltages from across input alignment electrode 65 and output alignment electrode 63, respectively, and reference electrode 52. In this example, the laser light will pass through the waveguide paths of modulator 50 and out of the output port 67 into the output optical fiber 93, and there from into the optical power meter 90. The XYZθφ 5-axis stage 97 is used for finely adjusting the alignment of input optical fiber 99 to input port 69 by finding the positioning for maximizing the detected power shown by optical power meter 90. Next, the XYZθφ 5-axis stage 95 is used for finely aligning or positioning the end of optical fiber 93 to the output port 67 for maximizing the power read on optical power meter 90. After these fine adjustments are made, the ends of the optical fibers 93 and 99 are affixed or secured in position to the output and input ports 67, 69, respectively. Conventional securement techniques are used, and the device may be assembled into an appropriate package or housing (not shown).

Note that the alignment electrodes, that is output electrode 63 and input electrode 65 are typically only used for purposes of alignment of the optical fibers 93 and 99, as described. Also, the method and apparatus as described is not limited to use for aligning optical fibers to the input and output ports of an optical modulator such as modulator 50, but can be used for aligning any optical multiport waveguide device, such as those of FIGS. 1 through 4, to the ends of associated optical fibers, as previously mentioned. It should be further noted that this technique permits submicron tolerances to be obtained in the alignment process. Also, through use of the present method and apparatus one can detect less than one micron in shift of an optical fiber in alignment with its associated input or output port of a semiconductor optical device. It should further be noted that the input and output ports of an associated optical waveguide device can be aligned to optical fibers independently or at the same time using the various embodiments of the present invention. Through use of the present inventive alignment method and apparatus, ambiguities are avoided. In other words, in the example of the optical modulator 50 of FIG. 9, through use of the present alignment apparatus and method the optical fibers are positioned at the primary mode positions of the waveguide, where light modulation can occur. Other prior methods of alignment are not as sensitive as the present method, and could result in the optical fibers being aligned at secondary light path mode positions where no light modulation can occur, in the instance of an optical modulator 50, for example.

The various embodiments of the present invention were conceived by the inventors as part of a program for improving the modulator structure of a Mach-Zehnder modulator. The improved modulator of FIG. 5, as shown, includes two Y-branches. One being formed by waveguide arms 29, 31, and 27, the other being formed by arms 37, 39, and 41. Arms 29 and 31, and arms 37 and 39, each have a 6° separation angle, a three micron waveguide ridge width, and active lengths that vary from 300 to 700 microns. The center-to-center spacing of the electrode arms 27, 33, 35, and 41 is twenty microns. The prototype device has a length of 2.5 millimeters.

The wafer for an engineering prototype for modulator 50 was grown by MOCVD on (100) $n^+$ InP S-doped at $10^{18}$ $cm^{-3}$. The first layer 75 is a 1 µm thick, S:InP buffer layer also doped to $10^{18}$ $cm^{-3}$, followed by a 0.1 µm thick, undoped InGaAsP cladding layer 77 with an energy gap of Eg=1.08 eV. The undoped quantum well region 79 consists of 5 unstrained InGaAsP (Eg=0.90 eV), 70 Å thick quantum wells and Eg=1.08 eV, 100 Å thick barriers. A second undoped, 0.1 µm thick InGaAsP buffer layer 81 (Eg=1.08 eV), a Zn:InP ($5 \times 10^{17}$ $cm^{-3}$) 1 µm thick waveguiding layer 83, and a 0.2 µm thick, Zn:InGaAs layer 85 ($10^{19}$ $cm^{-3}$) for ohmic contact are grown on top.

To fabricate the waveguide device, a 1000 Å thick layer of $SiN_x$ (not shown) is deposited using plasma enhanced chemical vapor deposition at 250° C. The $SiN_x$ is then patterned as a 3 µm wide ridge etching mask. A 0.85 µm deep InGaAs/InP ridge was formed by reactive ion etching in a 550 V, $CH_4/H_2$ (1:6) plasma. Next a 3000 Å thick $SiN_x$ 53 contact isolation layer is deposited, and then removed prior to e-beam deposition of Ti/Pt/Au (200 Å/500 Å/3000 Å) electrodes (59, 61, 63, 65). After the wafer was lapped to 150 µm thick, a Ge/Au/Ni/Au (270 Å/450 Å/215 Å/1200 Å) n-metal contact 52 was deposited on the substrate bottom surface and the contacts were annealed at 360° C. for 90 sec. The wafer was then cleaved into rows of devices, and a 1800 Å thick SiO anti-reflective layer was e-beam evaporated onto the cleaved facet surfaces.

Although various embodiments of the invention have been shown and described herein, they are not meant to be limiting. Those of skill in the art may recognize various modifications to the embodiments to the invention, which modifications are meant to be covered by the spirit and scope of the appended claims.

Figure 10:
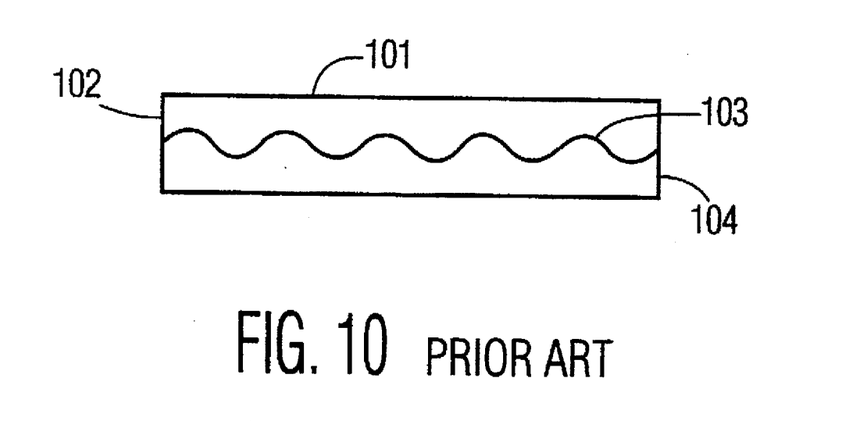
FIG. 10 is a simplified pictorial of a prior straight optical waveguide including a distributed Bragg reflector (DBR) or quarter wavelength grating serving as a reflector or mirror.
Figure 11:
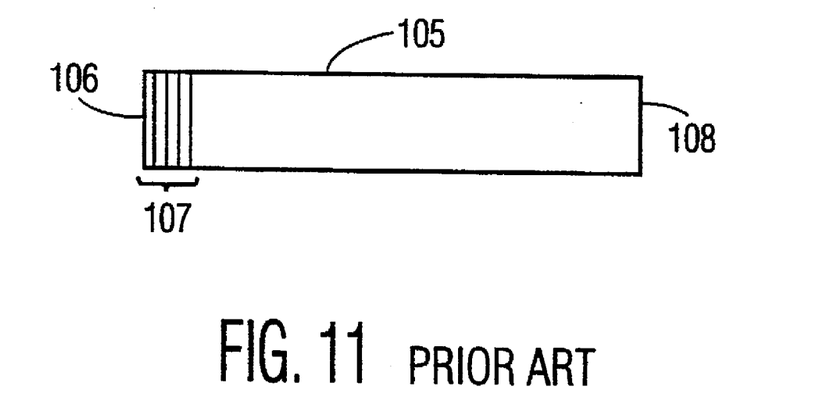
FIG. 11 is a simplified pictorial of a prior straight optical waveguide including a DBR provided by a quarter wavelength stack acting as a reflector or mirror.

For example, various embodiments of the present invention can be incorporated in semiconductor optical waveguides including "reflective geometry", where the same optical fiber is used for inputting light at one end of the waveguide, and receiving reflected output light from the same end. Straight waveguides using such "reflective geometry" are shown in FIG. 10 and FIG. 11, respectively. In FIG. 10, a simplified pictorial illustration of a prior straight optical waveguide 101 including a distributed BRAGG reflector (DBR) or quarter wavelength grating 103 serves as a reflector or mirror. As a result, either end 102 or 104 of the straight waveguide 101 can serve as both an input port for transmitting light into the waveguide 101, and as an output port for receiving reflected or output light back. Similarly, in FIG. 11, a simplified pictorial illustration of a known straight optical waveguide 105 including a DBR provided by a quarter wavelength stack 107 acting as a reflector or mirror at end 106 thereof. The other end 108 of waveguide 105 can serve as both an input port and output port for light traveling into and out of the waveguide 105. An alignment LED can be incorporated in the ends 102 and/or 104 of waveguide 101 of FIG. 10, and in the end 108 of waveguide 105, as described above for other waveguide configurations, for permitting an active alignment electrode and the light emitted by such alignment LED's to be used for positioning an end of a single optical fiber to an appropriate end of either of the waveguides 101 and 105, respectively. Note that a possible application is where the waveguide 101 or 105 is used as an external cavity for a laser for linewidth narrowing or for mode-locking.

What we claim is:

1. A method for aligning optical fibers to an optical semiconductor waveguide device comprising a substrate including at least a first input end, and a first output end associated with said first input end, for passing light from said first input end to said first output end, comprising the steps of:

forming a first light emitting diode (LED) in said substrate at said first output end;

forming a second light emitting diode (LED) in said substrate at said first input end;

adjustably retaining one end of a first output optical fiber close to said first output end;

connecting another end of said first output optical fiber to an input of an optical power meter;

applying a forward bias voltage across said first LED for outputting light there from at said first output end;

adjusting or aligning the positioning of said first output optical fiber to said first output end for maximizing and the detected power of the output light;

adjustably retaining one end of a first input optical fiber close to said first input end;

removing said first output optical fiber from said input of said optical power meter;

connecting another end of said first input optical fiber to an input of said optical power meter;

removing the forward bias voltage from said first LED;

applying a forward bias voltage across said second LED for outputting light there from at said first input end;

adjusting or aligning the positioning of said first input optical fiber to said first input end for maximizing the power of the detected light;

removing the forward bias from said second LED; and removing said another end of said first input optical fiber to the input of said optical power meter.

2. The method of claim 1, further comprising the steps of:

connecting the other end of said first output optical fiber to the input of said optical power meter;

connecting a desired light input signal to said another end of said first input optical fiber;

adjusting or aligning the positioning of said one end of said first output optical fiber at said first output end for maximizing the power of the detected light;

affixing the one end of said first output optical fiber to said first output end;

adjusting or aligning the positioning of said one end of said first input optical fiber to said first input end for maximizing the power of the detected light; and affixing the one end of said first input optical fiber to said first input end.

3. The method of claim 2, wherein said first and second LED's each consist of a PIN diode.

4. The method of claim 2, wherein said semiconductor waveguide includes a pathway between said first input end and said first output end for the transfer or passage of light there between, said pathway having primary and secondary input and output mode positions at said first input end, and said first output end, respectively, said method further including in the steps of forming said first and second LED's, respectively, the steps of:

positioning said first LED for emitting light from the primary output mode position at said first output end; and positioning said second LED for emitting light from the primary input mode position at said first input end.

5. The method of claim 1, wherein said waveguide device is a straight waveguide.

6. The method of claim 1, wherein said waveguide device consists of a Y-junction device.

7. The method of claim 1, wherein said waveguide device consists of a 3 dB coupler switch configuration.

8. The method of claim 1, wherein said waveguide device consists of a Mach-Zehnder modulator configuration.

9. The method of claim 1, wherein said waveguide device consists of a Mach-Zehnder interferometer with at least one Y-junction.

10. The method of claim 1, wherein said first and second LED's each consist of a PIN diode.

11. The method of claim 1, wherein said semiconductor waveguide includes a pathway between said first input end and said first output end for the transfer or passage of light there between, said pathway having primary and secondary input and output mode positions at said first input end, and said first output end, respectively, said method further including in the steps of forming said first and second LED's, respectively, the steps of:

positioning said first LED for emitting light from the primary output mode position at said first output end; and positioning said second LED for emitting light from the primary input mode position at said first input end.

12. A method for aligning optical fibers to an optical semiconductor waveguide device comprising a substrate including thereon a plurality of light guiding pathways each having two ends, for passing light between the ends of each of said plurality of pathways, said method comprising the steps of:

forming a plurality of individual light emitting diodes (LED's) in said substrate proximate each end of said plurality of pathways, respectively;

selecting the ends of said pathways to which individual optical fibers are to be connected, respectively;

adjustably retaining one end of each of a plurality of individual optical fibers close to an individual end of each one of said selected ends of said pathways, respectively;

connecting the other end of an optical fiber to be aligned to an input of an optical power meter;

applying a forward bias voltage across the LED associated with the respective selected end of one of said plurality of pathways, for causing said LED to emit light from the selected end out of the associated pathway;

adjusting the positioning of the one end of the optical fiber being aligned for maximizing the detected power of the output light received from the associated selected end of a pathway;

repeating said retrieving, connecting, bias voltage applying, and adjusting steps until each one of said plurality of individual optical fibers have one end, respectively, aligned with an individual one of the selected ends of said plurality of light guiding pathways, respectively; and removing the forward bias voltage for said light emitting diodes.

13. The method of claim 12, wherein for each of said pathways between a pair of said selected ends, respectively, each pair of selected ends one is designated as a light input end and the other as a light output end, said method further includes for fine alignment the steps of:

connecting a desired light input signal to another end of the optical fiber associated with said light input end of an associated pathway;

connecting another end of the optical fiber associated with said light output end of the associated pathway to an input of an optical power meter;

adjusting the positioning of the optical fiber associated with said light input end for maximizing the power of the light detected by said optical power meter;

affixing said one end of the optical fiber to said light input end;

adjusting the positioning of the one end of the optical fiber associated with said light output end for maximizing the power of the light detected by said optical power meter; and affixing said one end of the optical fiber to said light output end of the associated said pathway.

14. The method of claim 12, further including in said forming step the steps of:

positioning each one of said light emitting diodes for emitting light from the primary output mode position at the associated ends of said pathways, respectively.

15. The method of claim 12, wherein said light emitting diodes are PIN diodes.

16. A semiconductor optical waveguide device including a substrate, and at least one waveguide pathway formed on said substrate for passing light between the ends of said pathway, wherein the improvement comprises:

a first light emitting diode (LED) formed in said substrate at one end of said pathway, operative for emitting light out of said one end for permitting an end of a fiber optic cable to be aligned with the one end of said pathway for maximizing the transfer of light there between; and a second light emitting diode (LED) formed in said substrate at another end of said pathway, operative for emitting light out of said another end for permitting an end of a second fiber optic cable to be aligned with said another end of said pathway for maximizing the transfer of light there between.

17. The semiconductor optical waveguide device of claim 16, wherein said first LED and said second LED are positioned in said pathway for emitting light from the primary output mode positions at said one end and said another end, respectively.

18. The semiconductor optical waveguide device of claim 17, wherein each of said first and second LED's include:

a first electrode of electrical contact material formed on a bottom surface of said substrate;

a first layer above said first electrode, said first layer being doped to have a first conductivity;

a second layer above said first layer, said second layer being an intrinsic layer;

a third layer above said second layer, said third layer being doped to have a second conductivity opposite to said first conductivity layer, said third layer being configured to provide an optical waveguide pathway; and a second electrode of electrical contact material formed over said third layer.

19. The semiconductor optical waveguide device of claim 18, wherein said substrate consists of InP, said first layer is in said substrate, said second layer consists of InGaAsP, and said third layer consists of InP.

20. The semiconductor optical waveguide device of claim 18, wherein said substrate consists of InGaAsP.

21. The semiconductor optical waveguide device of claim 18, wherein said device is a Mach-Zehnder interferometer, and the improvement further includes a plurality of multiple quantum wells between said second layer and said third layer.

22. The semiconductor optical waveguide of claim 16, wherein said substrate consists of InP, and each of said first and second LED's include:

a first electrode of electrically conductive material formed on a bottom surface of said substrate;

a first layer above said first electrode in said substrate doped to have a first conductivity;

a second layer over said first in said substrate doped to have a lower concentration of said first conductivity relative to the doping of said first layer;

a third layer of InGaAsP over said second layer;

a fourth layer including a plurality of multiple quantum well structures over said third layer;

a fifth layer of InGaAsP over said fourth layer;

a sixth layer of InP over said fifth layer, said sixth layer being doped to have a second conductivity opposite that of said first conductivity, said sixth layer being part of an optical waveguide pathway, and being narrower than said fifth layer;

a capping layer of InGaAs over said sixth layer;

an electrical insulative layer formed over side portions of said sixth layer, and adjacent top portions of said fifth layers; and a second electrode of electrically conductive material formed over said electrical insulative material and said capping layer.

23. The semiconductor optical waveguide device of claim 22, wherein said first electrode consists of GeAuNiAu material.

24. The semiconductor optical waveguide device of claim 23, wherein said second electrode consists of TiPtAu material.

25. A semiconductor optical waveguide device including a substrate, and at least one waveguide pathway formed on said substrate in a reflective geometry, including reflective means at one end of said pathway for reflecting light beams traveling thereto from another end of said pathway back to said other end, whereby said other end serves as both an input and output port for the bidirectional passage of light through said pathway, wherein the improvement comprises:

a light emitting diode (LED) formed in said substrate at said other end of said pathway, operative for emitting light out of said other end for permitting an end of a fiber optic cable to be aligned with the other end of said pathway for maximizing the transfer of light there between.

26. The semiconductor optical waveguide device of claim 25, wherein said LED is positioned in said pathway for emitting light from the primary output mode position at said other of said pathway.

27. A method for aligning optical fibers to an optical semiconductor waveguide device comprising a substrate including at least one waveguide pathway formed on said substrate in a reflective geometry, said pathway including one end serving both as an input and output port, and reflective means formed in said pathway for reflecting light beams traveling from said one end to another end of said pathway therefrom back along said pathway to said one end, comprising the steps of:

forming a light emitting diode (LED) in said substrate at said one end;

adjustably retaining one end of an optical fiber close to said one end;

connecting another end of said first output optical fiber to an input of an optical power meter;

applying a forward bias voltage across said LED for outputting light therefrom at said one end; and adjusting or aligning the positioning of said optical fiber to said one end for maximizing the detected power of the output light.

28. The method of claim 27, wherein said pathway further includes primary and secondary output mode positions at said one end, said method further including in the steps of forming said LED, the steps of:

positioning said LED for emitting light from the primary output mode position at said one output end.

29. The method of claim 28, wherein said LED consists of a PIN diode.

30. The method of claim 27, wherein said LED consists of a PIN diode.

* * * * *